(12) United States Patent
Mossman et al.

(10) Patent No.: US 12,222,797 B2
(45) Date of Patent: Feb. 11, 2025

(54) DYNAMIC CONFIGURATION OF PROCESSOR SUB-COMPONENTS

(71) Applicant: Advanced Micro Devices, Inc., Santa Clara, CA (US)

(72) Inventors: James Mossman, Austin, TX (US); Robert Cohen, Austin, TX (US); Sudherssen Kalaiselvan, Santa Clara, CA (US); Tzu-Wei Lin, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/084,499

(22) Filed: Dec. 19, 2022

(65) Prior Publication Data

US 2024/0201777 A1    Jun. 20, 2024

(51) Int. Cl.
  *G06F 1/26*    (2006.01)
  *G06F 1/32*    (2019.01)
  *G06F 1/3287*  (2019.01)
  *G06F 1/3296*  (2019.01)

(52) U.S. Cl.
  CPC .......... *G06F 1/3296* (2013.01); *G06F 1/3287* (2013.01)

(58) Field of Classification Search
  CPC .............................. G06F 1/3296; G06F 1/3287
  See application file for complete search history.

(56) References Cited

U.S. PATENT DOCUMENTS

| | | | |
|---|---|---|---|
| 6,895,520 B1 | 5/2005 | Altmejd et al. | |
| 7,685,457 B2 | 3/2010 | Jacobson et al. | |
| 9,419,590 B2 | 8/2016 | Berzins et al. | |
| 9,983,652 B2 | 5/2018 | Piga et al. | |
| 10,025,367 B2 | 7/2018 | Kaburlasos et al. | |
| 10,261,570 B2 * | 4/2019 | Ramadoss | G06F 1/3206 |
| 10,261,882 B2 * | 4/2019 | Milojicic | G06F 1/3215 |
| 10,359,834 B2 | 7/2019 | Maiyuran et al. | |
| 2005/0108587 A1 | 5/2005 | Cooper | |
| 2014/0068300 A1 * | 3/2014 | Nishijima | G06F 1/3287 |
| | | | 713/322 |
| 2017/0068298 A1 * | 3/2017 | Mishaeli | G06F 1/3206 |
| 2017/0269673 A1 | 9/2017 | Lindahl et al. | |
| 2021/0064111 A1 | 3/2021 | Kaburlasos et al. | |
| 2022/0050517 A1 | 2/2022 | Ghetie | |
| 2022/0113784 A1 | 4/2022 | Alben et al. | |
| 2023/0068471 A1 * | 3/2023 | Vanderpool | G06F 1/3296 |

OTHER PUBLICATIONS

International Search Report and Written Opinion from related PCT Application No. PCT/US2023/084706 dated Apr. 17, 2024 (9 pages).

* cited by examiner

*Primary Examiner* — Xuxing Chen
(74) *Attorney, Agent, or Firm* — Greenberg Traurig, LLP

(57) ABSTRACT

The disclosed method includes observing a utilization of a target sub-component of a functional unit of a processor using a control circuit coupled to the target sub-component. The method also includes detecting that the utilization is outside a desired utilization range and throttling one or more sub-components of the functional unit to reduce a power consumption of the functional unit. Various other methods, systems, and computer-readable media are also disclosed.

20 Claims, 5 Drawing Sheets

DYNAMIC CONFIGURATION OF PROCESSOR SUB-COMPONENTS

BACKGROUND

A computing device's performance in running programs can be limited in part by its processor's performance. Various advancements have improved processor performance to increase a number of instructions per cycle that a processor can execute. For example, the addition of various circuits and components can allow a processor to perform actions in a more parallel fashion or otherwise reduce a requirement to perform actions in a specific order. Multi-core processors can further allow parallel computing and multithreading. A multi-core processor can include multiple cores or processing units, each capable of running threads independently. To further take advantage of these processor features, software programs can be optimized for parallel computing.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
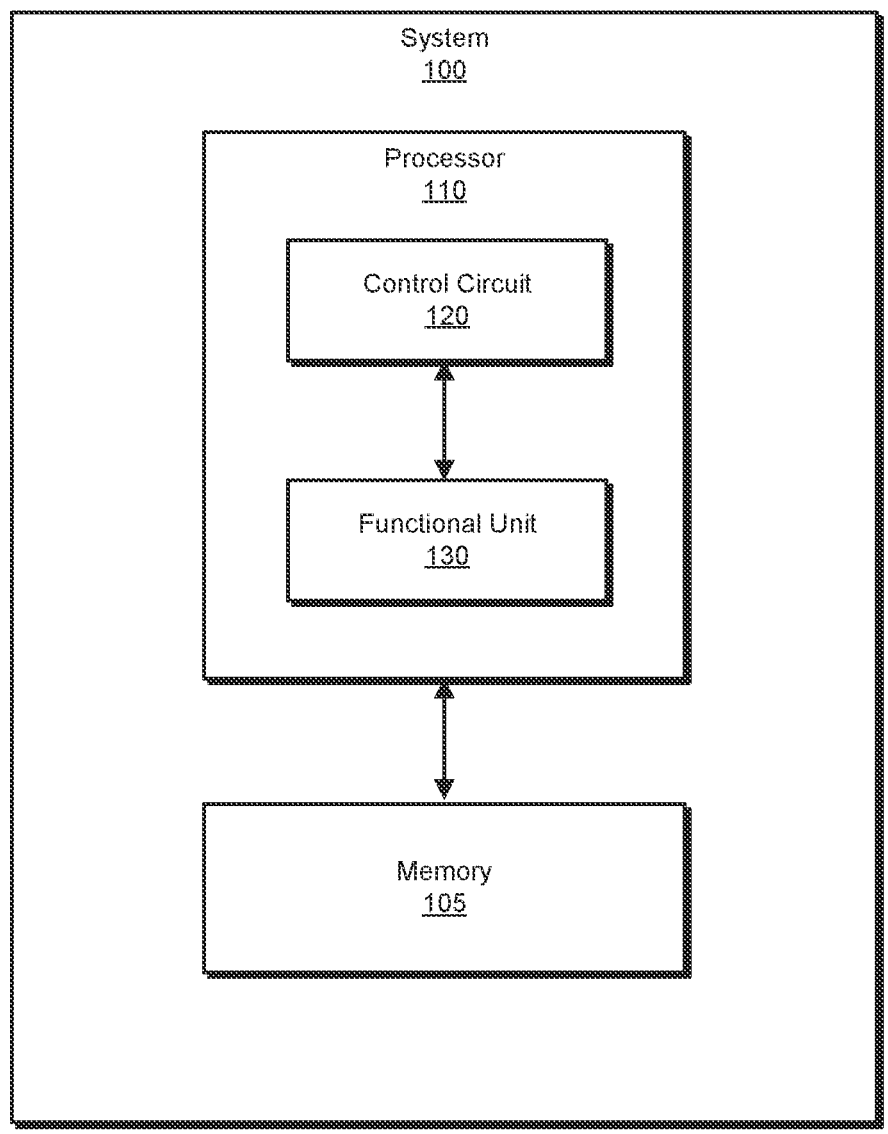
FIG. 1 is a block diagram of an exemplary processor including a control circuit for dynamically configuring sub-components.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to dynamic configuration of processor sub-components for power efficiency. Physical considerations can limit a processor's performance. As the additional processor components operate, the components can contribute to the processor's power consumption. Power consumption and the associated heat generation can adversely affect a processor's performance. Various techniques can address power consumption via software-based conditions that can trigger throttling a processor or components thereof. Such techniques are often abstracted from the processor hardware such that the throttling can take hundreds to thousands of cycles to respond to triggers. Such techniques can also be restricted in a granularity of observing and analyzing the processor. As will be explained in greater detail below, implementations of the present disclosure can implement a control circuit coupled to and in physical proximity of a functional unit of a processor and/or a sub-component thereof. The control circuit can observe whether a utilization of the functional unit and/or sub-component is outside of a desired utilization range and throttle portions of the processor as needed. By using a control circuit in such an arrangement, the systems and methods described herein can advantageously improve power efficiency and heat generation at a granular level with relatively low latency.

As will be described in greater detail below, the instant disclosure describes various systems and methods for dynamically configuring processor sub-components for improved power efficiency. The systems and methods described herein observe how a functional unit is utilized and throttle the functional unit if its utilization is outside a desired utilization range.

In one example, a device for dynamic configuration of processor sub-components includes a functional unit of a processor comprising at least one sub-component including a target sub-component and a control circuit coupled to the target sub-component. The control circuit is configured to observe a utilization of the target sub-component and detect that the utilization is outside a desired utilization range. The controller is also configured to throttle, in response to the detection, at least one sub-component of the functional unit to reduce a power consumption of the functional unit.

In some examples, the control circuit is further configured to observe a workload that is input into the target sub-component. In some examples, the at least one sub-component of the functional unit is selected for throttling based on reducing the workload that is input into the target sub-component. In some examples, the at least one sub-component of the functional unit is selected for throttling based on a workload type of the workload. In some examples, the workload corresponds to a minimal workload and the at least one sub-component corresponds to the target sub-component.

In some examples, throttling the at least one sub-component includes putting the at least one sub-component into a low-power state. In some examples, throttling the at least one sub-component includes throttling the functional unit.

In some examples, the control circuit is further configured to detect that the utilization is within the desired utilization range and dethrottle the at least one sub-component in response to detecting that the utilization is within the desired utilization range.

In some examples, the target sub-component corresponds to a micro-operation queue for storing predecoded instructions, and the functional unit further includes at least a first sub-component and a second sub-component each providing predecoded instructions to the micro-operation queue. In addition, the at least one sub-component corresponds to at least one of the first and second sub-components.

In some examples, the functional unit corresponds to at least one of an arithmetic logic unit (ALU), a floating-point unit (FPU), or a load-store unit (LSU). In some examples, the processor corresponds to a multi-core processor and the functional unit corresponds to a core of the multi-core processor.

In some examples, the device further includes a second functional unit of the processor comprising a second target sub-component, a second control circuit coupled to the second target sub-component, and a higher-level control circuit coupled to the control circuit and the second control circuit. The higher-level control circuit is configured to detect the throttling of the at least one sub-component of the functional unit and coordinate throttling of sub-components by the control circuit and the second control circuit.

In one example, a method for dynamic configuration of processor sub-components includes observing, using a control circuit coupled to a target sub-component of a functional unit of a processor, a utilization of the target sub-component based on a workload that is input into the target sub-component and detecting that the utilization is outside a desired utilization range for the workload. The method further includes throttling at least one sub-component of the functional unit to reduce a power consumption of the functional unit.

In some examples, the at least one sub-component of the functional unit is selected for throttling based on reducing the workload that is input into the target sub-component. In some examples, the workload corresponds to a minimal workload and the at least one sub-component corresponds to the target sub-component.

In some examples, the target sub-component corresponds to a micro-operation queue for storing predecoded instructions. The functional unit further includes at least a first sub-component and a second sub-component each providing predecoded instructions to the micro-operation queue. The at least one sub-component corresponds to at least one of the first and second sub-components.

In some examples, the method further includes detecting, using a higher-level control circuit coupled to the control circuit, the throttling of the at least one sub-component of the functional unit. The higher-level control circuit is further coupled to a second control circuit that is coupled to a second target sub-component of a second functional unit of the processor. The method also includes coordinating, using the higher-level control circuit, throttling of sub-components by the control circuit and the second control circuit.

In one implementation, a system for dynamic configuration of processor sub-components includes a physical memory and at least one physical processor including a functional unit and a control circuit. The functional unit includes at least one sub-component that has a target sub-component. The control circuit is coupled to the target sub-component and configured to observe a workload and a utilization of the target sub-component and detect that the utilization is outside a desired utilization range for the workload. The control circuit is also configured to throttle at least one sub-component of the functional unit to reduce a power consumption of the physical processor.

In some examples, the at least one sub-component of the functional unit is selected for throttling based on reducing the workload that is input into the target sub-component. In some examples, the target sub-component corresponds to a micro-operation queue for storing predecoded instructions, the functional unit further includes at least a first sub-component and a second sub-component each providing predecoded instructions to the micro-operation queue, and the at least one sub-component corresponds to at least one of the first and second sub-components.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-5, detailed descriptions of systems and methods for dynamic configuration of processor sub-components. Detailed descriptions of various example processors having control circuits for dynamic configuration of sub-components will be provided in connection with FIGS. 1-3. Detailed descriptions of an example dual pipeline for a micro-op cache will be provided in connection with FIG. 4. In addition, detailed descriptions of corresponding methods will also be provided in connection with FIG. 5.

FIG. 1 is a block diagram of an example system 100 for dynamic configuration of processor sub-components for power efficiency. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 105. Memory 105 generally represents any type or form of volatile or non-volatile storage device or medium capable of storing data and/or computer-readable instructions. Examples of memory 105 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 105. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), portions of one or more of the same, variations or combinations of one or more of the same, and/or any other suitable physical processor.

In some implementations, the term "instruction" refers to computer code that can be read and executed by a processor. Examples of instructions include, without limitation, macro-instructions (e.g., program code that requires a processor to decode into processor instructions that the processor can directly execute) and micro-operations (e.g., low-level processor instructions that are decoded from a macro-instruction and that form parts of the macro-instruction).

As further illustrated in FIG. 1, processor 110 includes a control circuit 120 and a functional unit 130. Control circuit 120 includes circuitry and/or instructions for dynamic configuration of a processor sub-component, such as functional unit 130. Functional unit 130 corresponds to any component and/or sub-component of processor 110, as described further herein. Functional unit 130 corresponds to an execution unit, such as an arithmetic logic unit (ALU), a floating-point unit (FPU), a load-store unit (LSU), etc., and/or sub-components thereof. In addition, although FIG. 1 illustrates a single control circuit 120 and a single functional unit 130, in other implementations processor 110 includes multiple different iterations of each, as described further herein.

As processor 110 operates, processor 110 powers on and shuts off functional unit 130 as needed to improve power efficiency and reduce heat generation. For example, as workload needs increase, processor 110 generally powers on and utilizes functional unit 130 accordingly. As the workload needs decrease, in particular if functional unit 130 is not needed, processor 110 shuts off functional unit 130, puts functional unit 130 into a low-power mode, or otherwise throttles functional unit 130. A control scheme determines when to throttle functional unit 130. Some control schemes rely on software, such as optimized code that more efficiently utilizes processor 110 and functional unit 130. Other control schemes observe workloads to processor 110 and predict workload trends to throttle functional unit 130. Yet other control schemes observe a performance of processor 110 to determine when to throttle functional unit 130. However, such control schemes for throttling functional unit 130 can be relatively slow, taking hundreds to thousands of processing cycles to react. For instance, such control schemes can be limited in granularity as to which components are powered on/off such that the powering on/off itself can be a relatively slow process.

Control circuit 120 resides in the hardware of processor 110 to provide a control scheme that is more localized to functional unit 130 than the previously described control schemes. Physical proximity and direct coupling to functional unit 130 reduces reaction time latency to a scale of tens of cycles. In addition, control circuit 120 is configured to dynamically configure (e.g., via powering on/off, throttling, etc.) functional unit 130 and/or one or more sub-components of functional unit 130, and further one or more pipelines that lead into functional unit 130. In addition, control circuit 120 is coupled to functional units that enable parallelism in processor 110. When control circuit 120 powers down functional unit 130, processor 110 can still operate on a pipeline that is parallel to functional unit 130. Thus, control circuit 120 provides a level of granularity regarding observation and configuration that may not be achievable with higher level control schemes.

Figure 2:
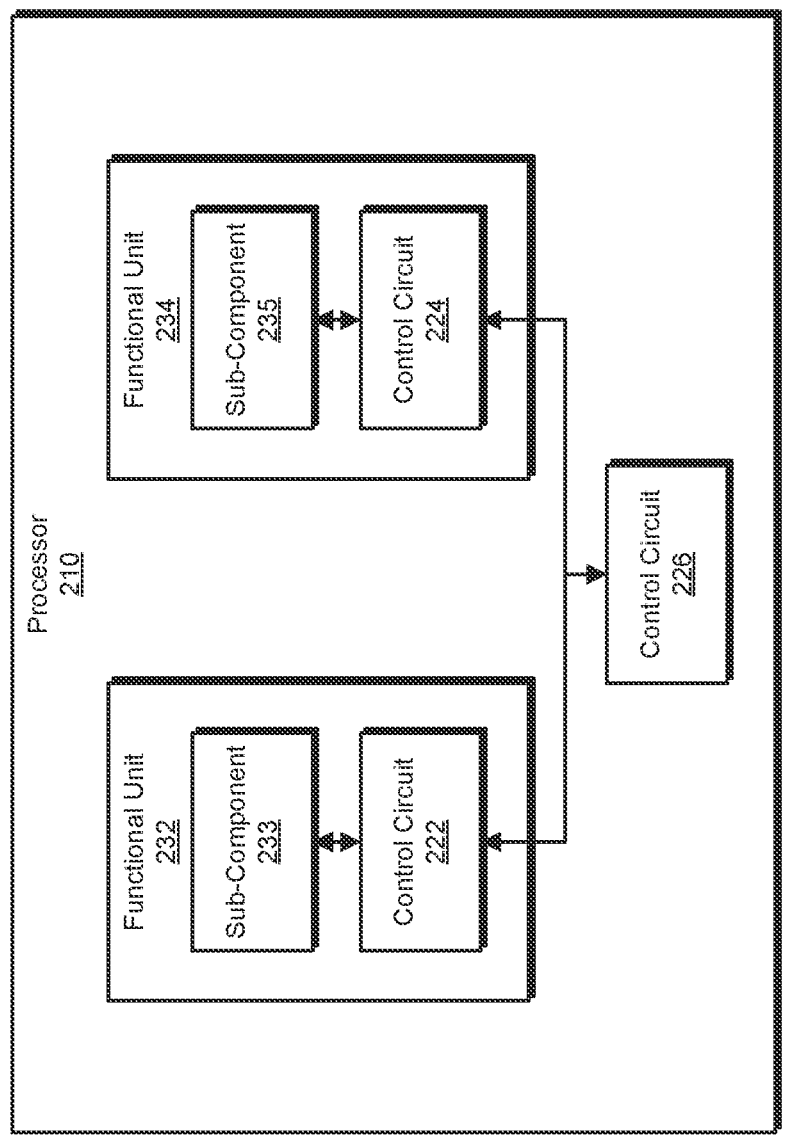
FIG. 2 is a block diagram of an exemplary processor including control circuits for dynamically configuring sub-components.

FIG. 2 illustrates an example processor 210, which corresponds to processor 110. Processor 210 includes a functional unit 232, which corresponds to functional unit 130, a functional unit 234, which corresponds to another iteration of functional unit 130, and a control circuit 226, which corresponds to control circuit 120. Functional unit 232 includes a sub-component 233 and a control circuit 222, which corresponds to control circuit 120. Functional unit 234 includes a sub-component 235 and a control circuit 224, which corresponds to control circuit 120.

Control circuit 222 observes functional unit 232 during operation. The physical proximity of control circuit 222 allows a granular level of observation of functional unit 232. Control circuit 222 observes, in some examples, a utilization of sub-component 233 and dynamically configure sub-component 233 accordingly. For instance, if the utilization is outside of a desired utilization range, control circuit 222 can throttle sub-component 233 and/or functional unit 232. The desired utilization range relates to a type of functional unit 232 and/or sub-component 233. For example, if sub-component 233 corresponds to a queue, the desired utilization range includes an upper limit relating to how full the queue is before having to reject new entries and a lower limit relating to how empty the queue is before the queue's usefulness is reduced.

If the utilization is below the desired utilization range, the under-utilization can indicate that functional unit 232 is not needed for a current workload type. For example, if the current workload corresponds to integer operations and functional unit 232 corresponds to an FPU, the current workload does not require the FPU or otherwise provides a minimal workload to the FPU, as indicated by the under-utilization. In response, control circuit 222 throttles sub-component 235 and/or functional unit 232 to reduce power consumption of processor 210.

If the utilization is above the desired utilization range, the over-utilization can indicate that functional unit 232 is not able to perform the current workload. Control circuit 222 throttles sub-component 233 to reduce the workload input into functional unit 232. For example, sub-component 233 corresponds to a pipeline that inputs the workload into functional unit 232. Control circuit 222 throttles or shuts off the pipeline to reduce the workload burden on functional unit 232. In some examples, control circuit 222 queues portions of the workload and burst the queued workload once functional unit 232 returns to the desired utilization.

In other examples, control circuit 222 takes preventative and/or predictive actions based on detecting trigger actions. For example, control circuit 222 detects a first stall event in functional unit 234 and a second stall event, which indicates a high probability of a third stall event. To prevent the third stall event, control circuit 222 accordingly throttles sub-component 233.

When control circuit 222 detects that the utilization is within the desired utilization range, control circuit 222 dethrottles sub-component 233 or otherwise reverses any throttling actions previously performed. Because of the latency available due to physical proximity, control circuit 222 is able to quickly react to such changes detected in the utilization of sub-component 233 and/or functional unit 232.

In some examples, control circuit 224 dynamically configures functional unit 234 and/or sub-component 235, similar to control circuit 222 as described above, and in other examples is tailored based on a type of functional unit 234. For instance, control circuit 224 observes and/or responds to different aspects of a utilization and/or workload of functional unit 234 and/or sub-component 235.

In some implementations, control circuit 224 coordinates with control circuit 222. For example, control circuit 226 is coupled to control circuit 222 and control circuit 224 to facilitate coordination. Control circuit 226 detects, based on feedback from control circuit 222 and/or control circuit 224, utilization trends for functional unit 232 and functional unit 234. Control circuit 226 instructs control circuit 222 and/or control circuit 224 to be more aggressive in throttling their respective functional units if the utilizations trend outside the desired utilization ranges (e.g., if the utilization is outside the desired utilization range at an increasing rate). Control circuit 226 instructs control circuit 222 and/or control circuit 224 to be less aggressive in throttling their respective functional units if the utilizations trend within the desired utilization ranges (e.g., if the utilization is outside the desired utilization range at a decreasing rate).

Additionally and/or alternatively, control circuit 226 instructs one of control circuit 222 and control circuit 224 to act in response to the other. For instance, if control circuit 222 throttles sub-component 233, control circuit 226 can instruct control circuit 224 to also throttle sub-component 235. Moreover, control circuit 226 allows graceful throttling and dethrottling of functional units and sub-components. Powering on multiple functional units simultaneously can cause undesirable power spikes in processor 210. Control circuit 226 coordinates staggered powering on of functional units to prevent such power spikes. Similarly, control circuit 226 coordinates staggered throttling of functional units to prevent excessive voltage drops in processor 210. Thus, control circuit 226 provides additional information for control circuit 222 and/or control circuit 224 for dynamically configuring their respective functional units.

Figure 3:
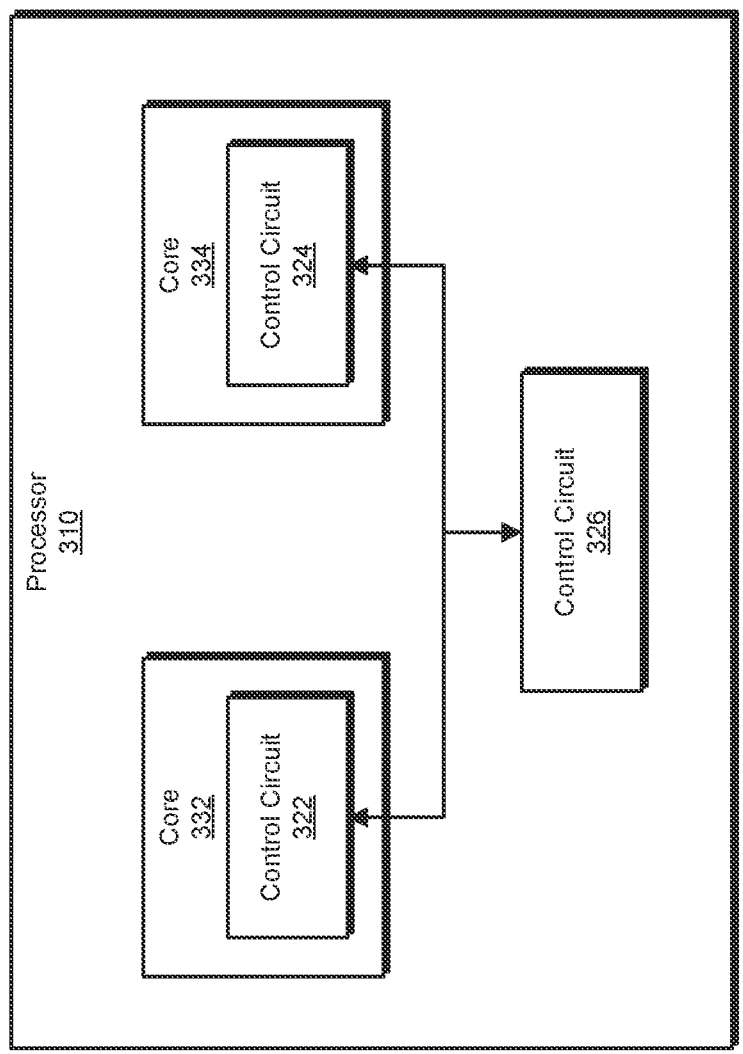
FIG. 3 is a block diagram of an exemplary multi-core processor including control circuits for dynamically configuring sub-components.

FIG. 3 illustrates an example multi-core processor 310, which corresponds to processor 110. Processor 310 includes a core 332, which corresponds to functional unit 130, a core 334, which can corresponds another iteration of functional unit 130, and a control circuit 326, which corresponds to control circuit 120. Core 332 includes a control circuit 322, which corresponds to control circuit 120. Core 334 includes a control circuit 324, which corresponds to control circuit 120.

In some examples, the dynamic configuration allows throttling of one or more cores (e.g., core 332 and/or core 334) of a multi-core processor (e.g., processor 310). Control circuit 322 throttles core 332 and/or sub-components thereof based on observing a utilization of core 332 and/or a workload of core 332 as described herein. Similarly, control circuit 324 throttles core 334 and/or sub-components thereof based on observing a utilization of core 334 and/or a workload of core 334 as described herein. Control circuit 326 coordinates dynamic configuration between control circuit 322 and control circuit 324 as described herein.

The physical proximities of control circuit 322 to core 332 and control circuit 324 to core 334 advantageously allow relatively low latency in dynamically configuring the respective cores. In addition, the control circuits allow virtualizing a big core into a smaller core (e.g., with respect to power consumption and heat generation) transparently to a software and/or operating system (OS). For example, control circuit 322 throttles one or more sub-components of core 332 when a full performance of core 332 is not needed. Alternatively, control circuit 322 and/or control circuit 326 throttles core 332 itself if core 334 can sufficiently handle a current workload. In some examples, the software and/or OS can signal or request reduced performance of processor 310.

Figure 4:
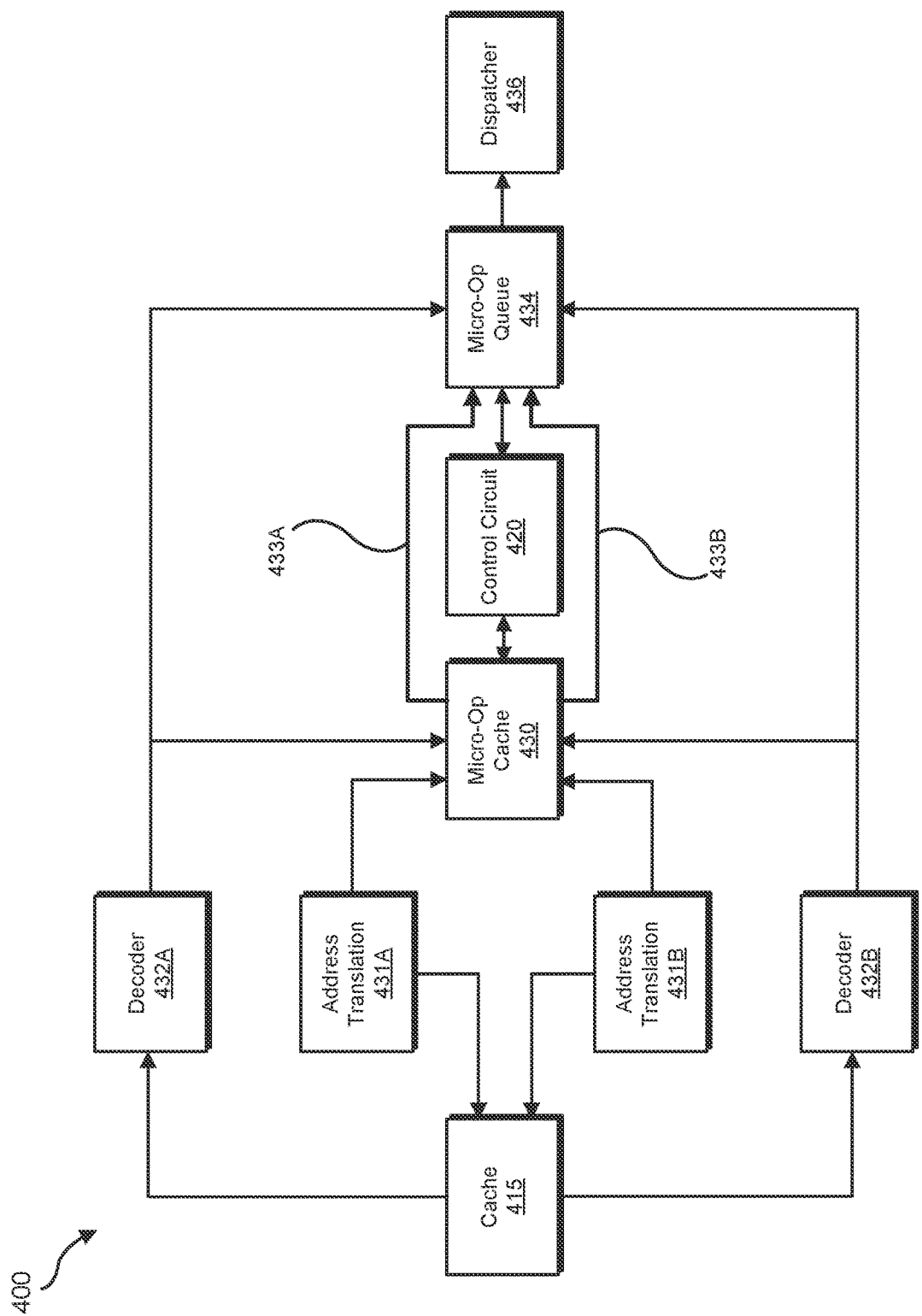
FIG. 4 is a block diagram of a dual pipeline for a micro-operation (micro-op) cache.

FIG. 4 illustrates a simplified example dual pipeline 400 (e.g., a CPU core front-end subsystem) for a micro-op cache 430, which corresponds to functional unit 130, of a processor such as processor 110 to a micro-op queue 434. FIG. 4 includes a first pipeline 433A from micro-op cache 430 to micro-op queue 434 and a second pipeline 433B from micro-op cache 430 to micro-op queue 434. FIG. 4 further includes a control circuit 420, which corresponds to control circuit 120, a cache 415 (e.g., an L1 cache or other cache of a processor/core, such as L2, L3, etc.), an address translation 431A, an address translation 431B, a decoder 432A, a decoder 432B and a dispatcher 436.

An instruction cycle of a processor includes a fetch stage, decode stage, and an execute stage. During the fetch stage, a next instruction, which is encoded, is fetched from a memory. During the decode stage, the instruction is decoded into micro-operations. During the execute stage, the decoded micro-operations are executed. FIG. 4 illustrates components that are used during the decode stage.

During the decode stage, the processor fetches instructions from cache 415 for decoding by decoder 432A and/or decoder 432B. Fetching the instructions for a requested memory address requires translation to fetch from cache 415. Each decoder uses a respective address translation unit (e.g., address translation 431A for decoder 432A and address translation 431B for decoder 432B). After fetching instructions, the decodes (e.g., decoder 432A and/or decoder 432B) decodes the instructions. The decoded instructions (e.g., micro-operations) are stored in a micro-op queue, such as micro-op queue 434 until the processor is ready to execute more micro-operations. A dispatcher such as dispatcher 436 selects micro-operations from micro-op queue 434 that are ready to be executed.

In the instruction cycle, particularly the decode stage, the process of decoding instructions can be relatively time consuming. To reduce the time required for decoding instructions, certain instructions can be predecoded and stored in a micro-op cache, such as micro-op cache 430. For example, certain instructions that are predicted to be accessed repeatedly are predecoded and stored in micro-op cache 430. Micro-op queue 434 is provided decoded instructions from micro-op cache 430 (e.g., via first pipeline 433A and/or second pipeline 433B) rather than directly from decoder 432A and/or decoder 432B.

In some examples, the processor has a high enough throughput (e.g., a large micro-op cache and/or large micro-op queue) such that micro-op cache 430 supports receiving instructions from more than one instruction pipeline or workload source. FIG. 4 illustrates a dual pipeline in which two independent pipelines (e.g., first pipeline 433A and second pipeline 433B, although in other examples micro-op queue 434 may be fed data/requests from multiple workload sources such as decoder 432A and/or address translation 431A and decoder 432B and/or address translation 431B) access and share micro-op cache 430.

However, in some scenarios, micro-op cache 430 is not used optimally. In some examples, the dual pipelines have caused over-utilization of micro-op queue 434. Micro-op queue 434 does not have enough free entries such that micro-op cache 430 can throttle its throughput. For instance, micro-op cache 430 is able to immediately accept read requests from address translation 431A (alternatively first pipeline 433A) but delay servicing requests from address translation 431B (alternatively second pipeline 433B). Operating requests from address translation 431B under these conditions can unnecessarily consume power.

In some examples, control circuit 420 is configured to detect and respond to these conditions. Control circuit 420 is coupled to micro-op cache 430 and/or micro-op queue 434 to observe its workload. Control circuit 420 observes the workload for a period of time, such as 30 cycles. Control circuit 420 can observe that the utilization of micro-op queue 434 is above a desired range, which in some examples is based on workload outputs of first pipeline 433A and second pipeline 433B, and in other examples is additionally or alternatively based on workload outputs from workload sources such as address translation 431A, address translation 431B, decoder 432A, decoder 432B, etc. For example, each of decoder 432A and decoder 432B outputs 6 entries per cycle. Control circuit 420 can observe (e.g., based on tokens) that a number of free entries during the period of time has remained at a low amount, such as 6-10 free entries, which would not support the output of both pipelines (e.g., 12 entries). During this period of time, micro-op queue 434 has rejected new entries from decoder 432B, causing a stall in second pipeline 433B. Because micro-op queue 434 is not able to support both first pipeline 433A and second pipeline 433B, control circuit 420 throttles second pipeline 433B to save power. Because second pipeline 433B is already stalled, throttling second pipeline 433B does not cause a significant reduction in performance or throughput. When control circuit 420 detects that the utilization is within the desired range (e.g., 12 or more free entries), micro-op queue 434 can be able to support both first pipeline 433A and second pipeline 433B. Control circuit 420 accordingly dethrottles second pipeline 433B (e.g., by accepting entries from decoder 432B).

Figure 5:
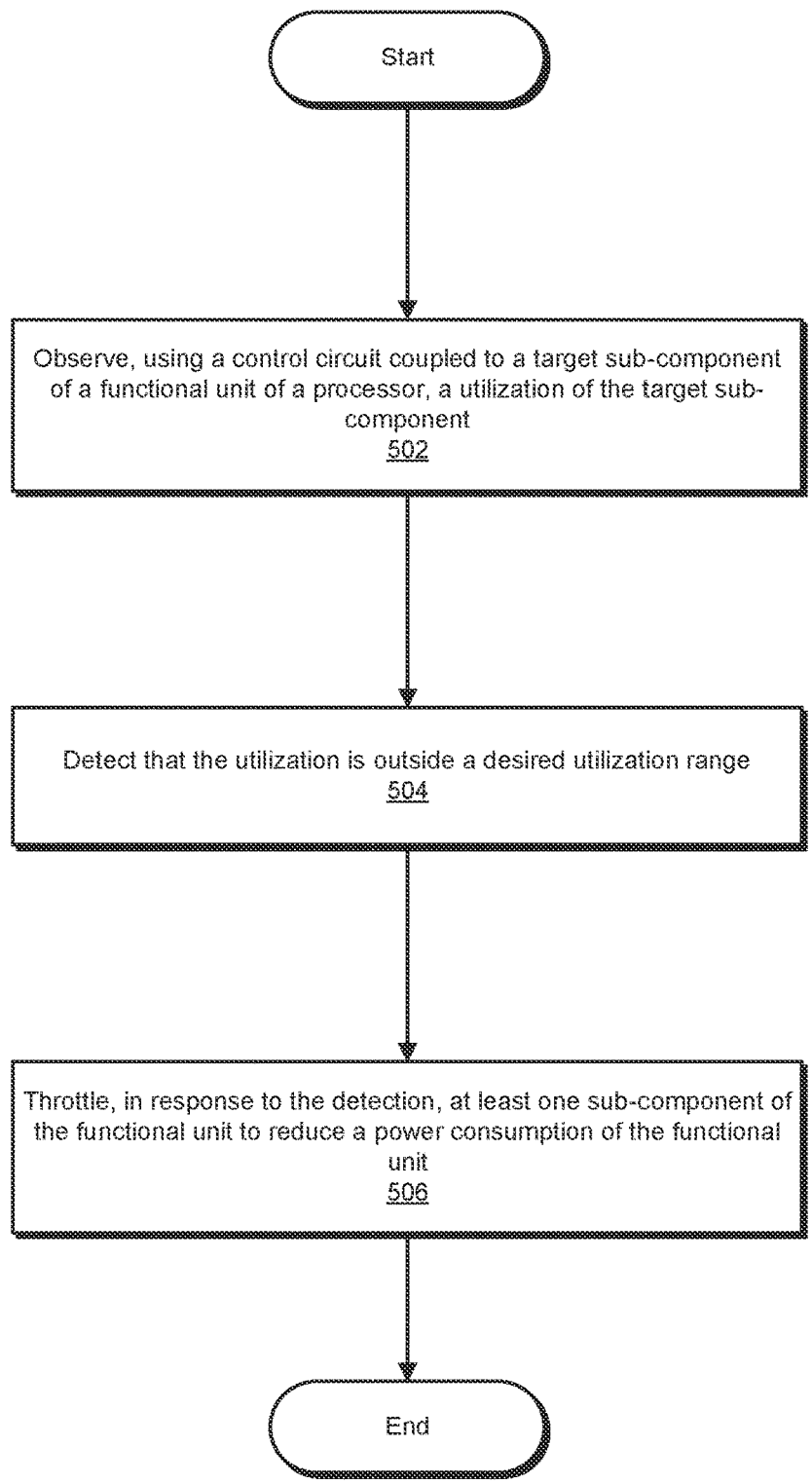
FIG. 5 is a flow diagram of an exemplary method for dynamic configuration of processor sub-components.

FIG. 5 is a flow diagram of an exemplary computer-implemented method 500 for dynamically configuring processor sub-components. The steps shown in FIG. 5 can be performed by any suitable computer-executable code and/or computing system, including the system(s) illustrated in FIGS. 1 and/or 2. In one example, each of the steps shown in FIG. 5 can represent an algorithm whose structure includes and/or is represented by multiple sub-steps, examples of which will be provided in greater detail below.

As illustrated in FIG. 5, at step 502 one or more of the systems described herein observes, using a control circuit coupled to a target sub-component of a functional unit of a processor, a utilization of the target sub-component. For example, control circuit 120 observes a utilization of functional unit 130 and/or a sub-component thereof.

The systems described herein can perform step 502 in a variety of ways. In one example, control circuit 120 observes a workload that is input into the target sub-component. In some examples, the target sub-component corresponds to a micro-operation cache (e.g., micro-op cache 430) and/or micro-operation queue (e.g., micro-op queue 434) for storing predecoded instructions. The functional unit includes at least a first sub-component (e.g., decoder 432A, address translation 431A, and/or first pipeline 433A) and a second sub-component (e.g., decoder 432B, address translation 431B, and/or second pipeline 433B) each providing predecoded instructions and/or requests to the micro-operation cache and/or micro-operation queue. The at least one sub-component corresponds to at least one of the first and second sub-components.

In some examples, control circuit 420 observes micro-op queue 434 and its utilization via tokens as available to micro-op cache 430 (e.g., token levels as described herein), whether micro-op queue 434 is blocked by downstream stalls, and/or a rate of output/dispatches of micro-op queue 434.

In some examples, the functional unit corresponds to at least one of an arithmetic logic unit (ALU), a floating-point unit (FPU), or a load-store unit (LSU). In some examples, the processor corresponds to a multi-core processor and the functional unit corresponds to a core of the multi-core processor (see, e.g., FIG. 4).

At step 504 one or more of the systems described herein detects that the utilization is outside a desired utilization range. For example, control circuit 120 detects that the utilization of functional unit 130 is outside a desired utilization range. The desired utilization range is based on a type of functional unit and/or a type of workload as described herein.

At step 506 one or more of the systems described herein throttles, in response to the detection, at least one sub-component of the functional unit to reduce a power consumption of the functional unit. For example, control circuit 120 throttles functional unit 130 and/or a sub-component thereof.

The systems described herein can perform step 506 in a variety of ways. In one example, throttling the at least one sub-component includes putting the at least one sub-component into a low-power state. In some examples, throttling the at least one sub-component includes reducing an output rate of the at least one sub-component. In some examples, throttling the at least one sub-component includes throttling the functional unit itself.

In some examples, control circuit 120 selects a particular sub-component of functional unit 130 for throttling that is different from the target sub-component (e.g., the sub-component being observed). In some examples, the at least one sub-component of the functional unit is selected for throttling based on reducing the workload that is input into the target sub-component. Control circuit 120 selects a sub-component from one of multiple pipelines or workload sources for a micro-op cache and/or micro-op queue to reduce a workload that is input into the micro-op cache and/or micro-op queue. For instance, control circuit 420 selects address translation 431B, decoder 432B, and/or micro-op cache 430 (e.g., to throttle one of first pipeline 433A and second pipeline 433B) to reduce a workload that is input into micro-op queue 434. Control circuit 420 can select a sub-component that is already stalled or can select a sub-component that is causing another sub-component to stall. In other examples, control circuit 420 selects the target sub-component itself (e.g., micro-op queue 434 being observed) for throttling.

In some examples, the at least one sub-component of the functional unit is selected for throttling based on a workload type of the workload. For instance, control circuit 120 selects an integer unit for throttling if the workload corresponds to floating-point operations.

In some examples, the workload corresponds to a minimal workload and the at least one sub-component corresponds to the target sub-component. For instance, control circuit 120 detects that a current phase of the workload for an FPU does not require floating-point operations and accordingly throttles the FPU.

In some examples, control circuit 120 also detects that the utilization is within the desired utilization range (e.g., in response to a previous throttling of the at least one sub-component) and dethrottles the at least one sub-component in response to detecting that the utilization is within the desired utilization range. For instance, control circuit 120 previously shut off the selected sub-component from one of multiple pipelines to a micro-op cache and/or micro-op queue. After detecting the micro-op cache and/or micro-op queue is within the desired utilization range, control circuit 120 reenables the shut off sub-component to restore the corresponding pipeline to the micro-op cache and/or micro-op queue.

As illustrated in FIG. 4, in some examples, the target sub-component corresponds to a micro-operation queue for storing predecoded instructions and the functional unit further includes at least a first sub-component and a second sub-component each providing predecoded instructions and/or entries to the micro-operation queue. The at least one sub-component corresponds to at least one of the first and second sub-components.

In some examples, a higher-level control circuit (e.g., control circuit 226) coupled to the control circuit (e.g., control circuit 222) detects the throttling of the at least one sub-component (e.g., sub-component 233) of the functional unit (e.g., functional unit 232). The higher-level control circuit is coupled to a second control circuit (e.g., control circuit 224) that is coupled to a second target sub-component (e.g., sub-component 235) of a second functional unit (e.g., functional unit 234) of the processor. The higher-level control circuit coordinates throttling of sub-components by the control circuit and the second control circuit.

As described herein, the present disclosure provides systems and methods for dynamically configuring processor sub-components. A program can have various phases as it executes, such as integer operations, floating point operations, loops, etc. A control circuit can identify a program phase and which sub-components are needed for executing the program phase. The control circuit can power off or throttle sub-components that are not needed for the identified program phase. Because the control circuit can reside in physical proximity to the sub-components it observes and throttles, the control circuit can respond at a higher granularity and higher frequency than other techniques can allow. For example, the control circuit is able to observe a workload of the sub-components more directly rather than relying on feedback provided by the functional unit.

For example, a sub-component can receive inputs from multiple pipelines. The control circuit can observe a current workload of the sub-component and determine that operating the multiple pipelines does not produce a performance benefit for the current workload. The control circuit can accordingly maintain a single pipeline and shut down the other pipelines (e.g., by shutting down one or more sub-components along the respective pipelines) to reduce power consumption. Thus, the systems and methods described herein can advantageously allow maximum performance for high-throughput workloads using multiple pipelines while minimizing power consumption for low-throughput workloads.

As detailed above, the computing devices and systems described and/or illustrated herein broadly represent any type or form of computing device or system capable of executing computer-readable instructions, such as those contained within the units or circuits described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the units described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more units stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SOCs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
observing, using a control circuit coupled to a target sub-component of a functional unit of a processor, a utilization of the target sub-component, wherein the target sub-component corresponds to one of a plurality of pipelines executing in parallel;
detecting that the utilization is outside a desired utilization range; and
throttling at least one sub-component of the functional unit to shut off the one of the plurality of pipelines.

2. The method of claim 1, further comprising observing, using the control circuit, a workload that is input into the target sub-component.

3. The method of claim 2, wherein the at least one sub-component of the functional unit is selected for throttling based on reducing the workload that is input into the target sub-component.

4. The method of claim 2, wherein the at least one sub-component of the functional unit is selected for throttling based on a workload type of the workload.

5. The method of claim 2, wherein the workload corresponds to a minimal workload and the at least one sub-component corresponds to the target sub-component.

6. The method of claim 1, wherein throttling the at least one sub-component comprises putting the at least one sub-component into a low-power state.

7. The method of claim 1, wherein throttling the at least one sub-component comprises throttling the functional unit.

8. The method of claim 1, further comprising:
detecting that the utilization is within the desired utilization range; and
dethrottling the at least one sub-component in response to detecting that the utilization is within the desired utilization range.

9. The method of claim 1, wherein:
the target sub-component corresponds to a micro-operation cache for storing predecoded instructions;
the functional unit further comprises at least a first pipeline and a second pipeline each comprising sub-components for providing predecoded instructions to the micro-operation cache; and the at least one sub-component corresponds to at least one of the first and second pipelines.

10. The method of claim 1, wherein the functional unit corresponds to at least one of an arithmetic logic unit (ALU), a floating-point unit (FPU), or a load-store unit (LSU).

11. The method of claim 1, wherein the processor corresponds to a multi-core processor and the functional unit corresponds to a core of the multi-core processor.

12. The method of claim 1, further comprising:
detecting, using a higher-level control circuit coupled to the control circuit, the throttling of the at least one sub-component of the functional unit, wherein the higher-level control circuit is further coupled to a second control circuit that is coupled to a second target sub-component of a second functional unit of the processor; and
coordinating, using the higher-level control circuit, throttling of sub-components by the control circuit and the second control circuit.

13. A method comprising:
observing, using a control circuit coupled to a target sub-component of a functional unit of a processor, a utilization of the target sub-component based on a workload that is input into the target sub-component, wherein the target sub-component corresponds to one of a plurality of pipelines executing in parallel;
detecting that the utilization is outside a desired utilization range for the workload; and
throttling at least one sub-component of the functional unit to shut off the one of the plurality of pipelines.

14. The method of claim 13, wherein the at least one sub-component of the functional unit is selected for throttling based on reducing the workload that is input into the target sub-component.

15. The method of claim 13, wherein the workload corresponds to a minimal workload and the at least one sub-component corresponds to the target sub-component.

16. The method of claim 13, wherein:
the target sub-component corresponds to a micro-operation cache for storing predecoded instructions;
the functional unit further comprises at least a first pipeline and a second pipeline each comprising sub-components for providing predecoded instructions to the micro-operation cache; and
the at least one sub-component corresponds to at least one of the first and second pipelines.

17. The method of claim 13, further comprising:
detecting, using a higher-level control circuit coupled to the control circuit, the throttling of the at least one sub-component of the functional unit, wherein the higher-level control circuit is further coupled to a second control circuit that is coupled to a second target sub-component of a second functional unit of the processor; and
coordinating, using the higher-level control circuit, throttling of sub-components by the control circuit and the second control circuit.

18. A system comprising:
a physical memory; and
at least one physical processor comprising:
a functional unit comprising at least one sub-component including a target sub-component, wherein the target sub-component corresponds to one of a plurality of pipelines executing in parallel;
a control circuit coupled to the target sub-component and configured to:
observe a workload and a utilization of the target sub-component;
detect that the utilization is outside a desired utilization range for the workload; and
throttle at least one sub-component of the functional unit to shut off the one of the plurality of pipelines.

19. The system of claim 18, wherein the at least one sub-component of the functional unit is selected for throttling based on reducing the workload that is input into the target sub-component.

20. The system of claim 18, wherein:
the target sub-component corresponds to a micro-operation cache for storing predecoded instructions;
the functional unit further comprises at least a first pipeline and a second pipeline each comprising sub-components for providing predecoded instructions to the micro-operation cache; and
the at least one sub-component corresponds to at least one of the first and second pipelines.

* * * * *